United States Patent
Sekikawa

(10) Patent No.: US 9,946,249 B2
(45) Date of Patent: Apr. 17, 2018

(54) CONTROL DEVICE OF MACHINING TOOL WITH POWER CONSUMPTION REDUCTION FUNCTION

(71) Applicant: FANUC Corporation, Yamanashi (JP)

(72) Inventor: Yuuta Sekikawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 288 days.

(21) Appl. No.: 14/831,356

(22) Filed: Aug. 20, 2015

(65) Prior Publication Data
US 2016/0062339 A1    Mar. 3, 2016

(30) Foreign Application Priority Data

Aug. 27, 2014 (JP) ................. 2014-172987

(51) Int. Cl.
G05B 19/401    (2006.01)
G05B 19/408    (2006.01)

(52) U.S. Cl.
CPC ........ *G05B 19/4083* (2013.01); *G05B 2219/34306* (2013.01); *G05B 2219/35472* (2013.01); *G05B 2219/49219* (2013.01)

(58) Field of Classification Search
None
See application file for complete search history.

(56) References Cited

U.S. PATENT DOCUMENTS

2010/0026102 A1    2/2010    Landgraf et al.

FOREIGN PATENT DOCUMENTS

| JP | 4-269150 A | 9/1992 |
| JP | 2000-094266 A | 4/2000 |
| JP | 2001-277071 A | 10/2001 |
| JP | 2005-230955 A | 9/2005 |
| JP | 2010-040046 A | 2/2010 |
| JP | 2010-105101 A | 5/2010 |
| JP | 2010-240800 A | 10/2010 |

OTHER PUBLICATIONS

Decision to Grant a Patent in JP Application No. 2014-172987, dated Aug. 2, 2016.

*Primary Examiner* — Ryan Jarrett
(74) *Attorney, Agent, or Firm* — Hauptman Ham, LLP

(57) ABSTRACT

A control device of a machining tool with power consumption reduction function includes an execution unit configured to execute control of devices using parameter extracted from a parameter set storage unit, based on a selected priority mode and operation condition of the machining tool. At least one parameter set stored in the parameter storage unit is set with a parameter corresponding to the heating device having a value for making the heating device in an on state and a parameter corresponding to the cooling device having a value for making the cooling device in an on state.

4 Claims, 3 Drawing Sheets

| PRIORITY MODE | OPERATION CONDITION OF MACHIING TOOL | | | |
|---|---|---|---|---|
| | AUTOMATIC OPERATION WITH OPERATOR | AUTOMATIC OPERATION WITHOUT OPERATOR | SETTING UP STATE | STAND-BY STATE |
| POWER CONSUMPTION | PARAMETER 1 | PARAMETER 2 | PARAMETER 3 | PARAMETER 4 |
| THERMAL DISPLACEMENT | PARAMETER 11 | PARAMETER 12 | PARAMETER 13 | PARAMETER 14 |

FIG. 3A

|  | PARAMETER 1 | PARAMETER 2 | PARAMETER 3 | PARAMETER 4 |
|---|---|---|---|---|
| LIGHTING DEVICE | ON | OFF | ON | OFF |
| COOLANT | ON | ON | OFF | OFF |
| COOLING DEVICE | ON | ON | ON | OFF |
| HEATING DEVICE | ON | ON | ON | OFF |
| LUBRICANT PUMP | ON | ON | OFF | OFF |
| AIR PURGE | ON | ON | OFF | OFF |
| MIST COLLECTOR | ON | ON | OFF | OFF |
| CHIP CONVEYER | ON | ON | OFF | OFF |

FIG. 3B

|  | PARAMETER 11 | PARAMETER 12 | PARAMETER 13 | PARAMETER 14 |
|---|---|---|---|---|
| LIGHTING DEVICE | ON | OFF | ON | OFF |
| COOLANT | ON | ON | OFF | OFF |
| COOLING DEVICE | ON | ON | ON | ON |
| HEATING DEVICE | ON | ON | ON | ON |
| LUBRICANT PUMP | ON | ON | OFF | OFF |
| AIR PURGE | ON | ON | OFF | OFF |
| MIST COLLECTOR | ON | ON | OFF | OFF |
| CHIP CONVEYER | ON | ON | OFF | OFF |

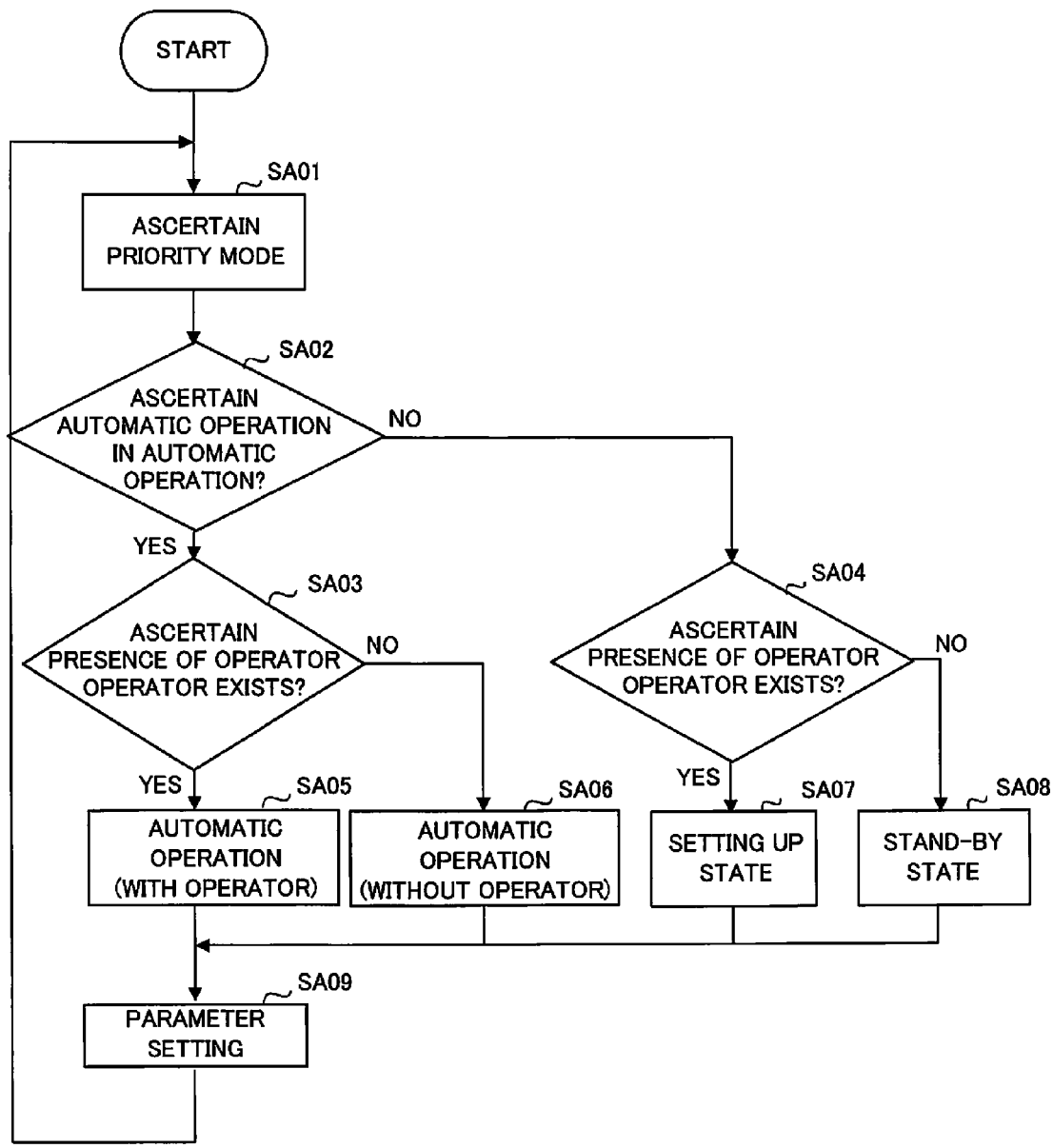

CONTROL DEVICE OF MACHINING TOOL WITH POWER CONSUMPTION REDUCTION FUNCTION

RELATED APPLICATIONS

The present application claims priority to Japanese Application Number 2014-172987, filed Aug. 27, 2014, the disclosure of which is hereby incorporated by reference herein in its entirety.

BACKGROUND OF THE INVENTION

1. Field of the Invention

The present invention relates to a control device of a machining tool having function of power consumption reduction function.

2. Description of the Related Art

Recent environmental problems and fossil fuel resource problems intensively requires power consumption reduction. Power consumption reduction is also required for machining tools which consume much electric power. It is necessary for machining tools to reduce waste power consumption and effective use of electric power, since the machining tool must reduce power consumption while keeping production capacity.

Electric power used in a machining tool is generally consumed in a motor for machining a workpiece, a pump, heater, lighting for assisting the machining, a cooling device to cool a heat source, a power source for supplying power to a control device, and the like. In addition to that, power consumption in an air compressor of a factory indirectly depends on the machining tool.

A conventional power consumption reduction method is commonly known, in that a lighting or a motor is stopped when no operation time continues or predetermined time passes after an end of specified operation. Here, it is common to use a timer for a stop condition (See, Japanese Patent Laid-Open No. 2000-094266, Japanese Patent Laid-Open No. 2010-040046).

However, effective stopping operation is impossible when a timer is used for a stop condition, in a case where the timer works when operation of the timer is not needed or the timer stops when operation of the timer is needed. In addition, machining accuracy is important for a machining tool, and thermal displacement has significant influence on the machining accuracy. In a case where a heater or a cooling device is stopped when it is not required and is restarted when it is required for power consumption reduction, thermal balance of the machining tool is significantly deteriorated and it becomes impossible to keep stable machining accuracy.

The control device disclosed in Japanese Patent Laid-Open No. 2000-094266 is such a control device for a machining tool that, a lighting within machining region is automatically stopped when unnecessary, and the control device uses a timer for a timing to enables power consumption reduction function. There is a problem that the lighting continues to be lighted when the operator does not exists, or the lighting is turned off while the operator is working.

Japanese Patent Laid-Open No. 2010-040046 discloses a technique in which a plurality of energy saving modes are prepared and the energy saving mode is selected based on operation condition. However, a problem in machining accuracy may happen in the technique, since this technique does not take into account the influence of the thermal displacement and significant thermal displacement may be generated when priority is given to the power consumption reduction. There is another problem it is impossible to instantly grasp the condition of the machining tool since a timer is used for grasping the condition of the machining tool.

SUMMARY OF THE INVENTION

Therefore, the object of the invention is to provide a control device of a machining tool provided with power consumption reduction function having a power consumption reduction mode which considers the thermal displacement, and power consumption reduction function to quickly detect the operation condition of the machining tool for improving reduction of power consumption.

A control device of a machining tool provided with power consumption reduction function according to the present invention is the control device of the machining tool with power consumption reduction function, including a plurality of power consumption devices, the power consumption devices including at least one of a heating device and a cooling device, the control device of a machining tool with power consumption reduction function including a priority mode selection unit configured to select at least one priority mode from a plurality of priority modes, a parameter set storage unit configured to store a plurality of parameter sets, the parameter is to be used for control the plurality of the devices and the each parameter set corresponding to the priority mode and the operation condition of the machining tool, an operation condition monitoring unit configured to monitor operation condition of the machining tool, an extraction unit configured to extract the parameter set from the parameter set storage unit based on the selected priority mode and the operation condition of the machining tool, and an execution unit configured to execute control of the devices based on the extracted parameter. At least one parameter set stored in the parameter storage unit is set with a parameter corresponding to the heating device having a value for making the heating device in an on state and a parameter corresponding to the cooling device having a value for making the cooling device in an on state.

The control device of a machining tool with power consumption reduction function may further include an operator monitoring unit configured to monitor whether an operator exists around the machining tool, and the operation condition monitoring unit may determine the operation condition of the machining tool based on an operation mode of the machining tool and monitoring result by the operator monitoring unit.

The operation condition monitoring unit may determine the operation condition of the machining tool is in setup mode when the operation mode of the machining tool is not automatic operation mode and the operator monitoring unit determines that the operator exists.

Alternatively, the operation condition monitoring unit may determine the operation condition of the machining tool is in waiting mode when the operation mode of the machining tool is not automatic operation mode and the operator monitoring unit determines that the operator does not exist.

BRIEF DESCRIPTION OF THE DRAWINGS

The above-described object, the other object, and the feature of the invention will be proved from the description of embodiments below with reference to the accompanying drawings. In these drawings:

FIGS. 3A and 3B are examples of parameter settings according to an embodiment of the present invention.

FIG. 4 is a flow chart of power consumption reduction process according to an embodiment of the present invention.

DETAILED DESCRIPTION OF THE PREFERRED EMBODIMENTS

Figures 1, 2:
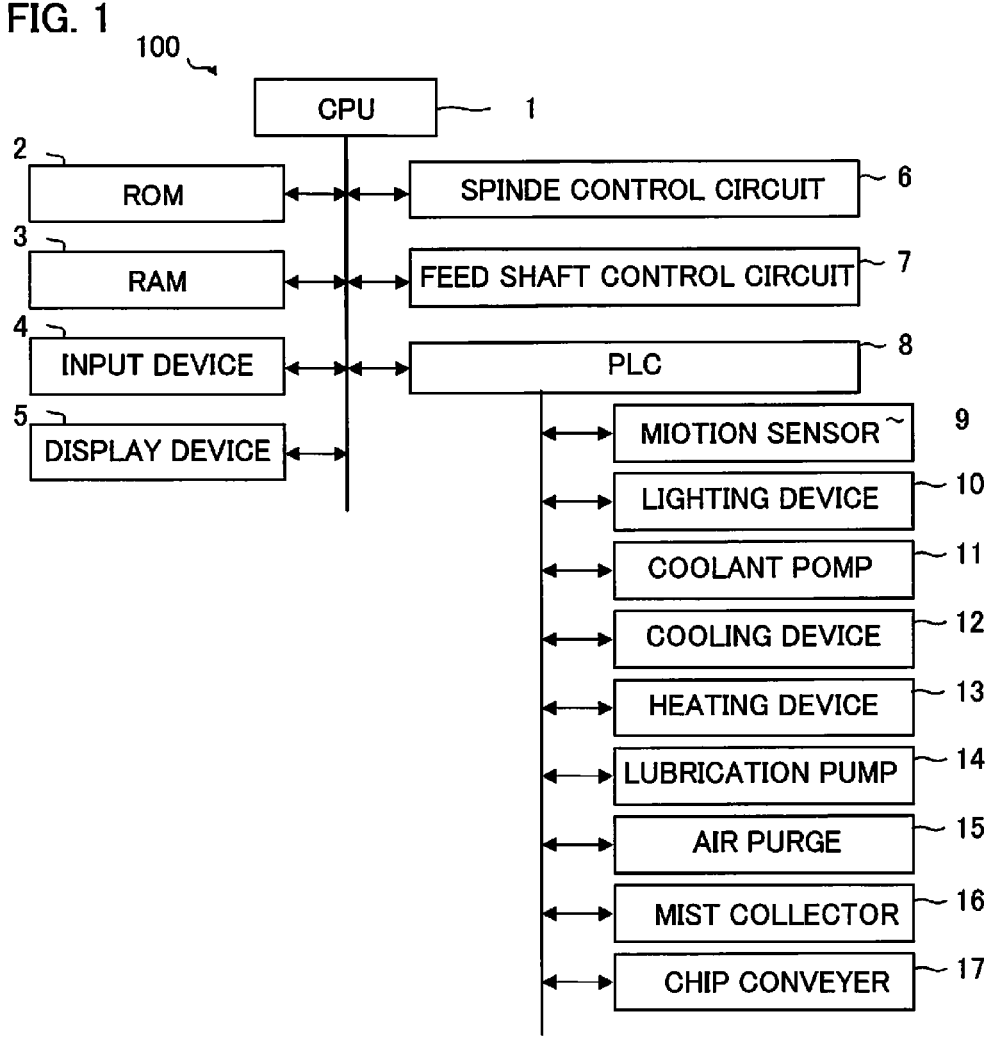
FIG. 1 is a block diagram of the numerical control device according to an embodiment of the present invention.
FIG. 2 is a configuration table according to an embodiment of the present invention.

FIG. 1 is a block diagram of the numerical control device according to an embodiment of the present invention. A control device 100 includes a CPU 1, a ROM 2, a RAM 3, an input device 4, a display device 5, a spindle control circuit 6, a feed shaft control circuit 7, a PLC 8. The CPU 1 is connected via a bus with a respective element of the ROM 2, the RAM 3, the input device 4, the display device 5, the spindle control circuit 6, the feed shaft control circuit 7, and the PLC 8. The CPU 1 reads out a system program installed in the ROM 2 via a bus, and control the whole control device 100 according to the system program.

Various kinds of system programs, for executing a processing in an editorial mode necessary to generate and edit a machining program or a processing of an automatic operation or an energy consumption reduction control, are written in the ROM 2 in advance. The RAM 3 stores various kinds of data such as a temporary calculation data, a temporary display data, and priority mode setting data input by the operator via the input device 4.

The input device 4 is a manual data input device equipped with a keyboard and a switch, while the display device 5 is composed of a liquid crystal device, a touch panel display, or the like.

The spindle control circuit 6 and the feed shaft control circuit 7 receives a spindle rotation command and a command of movement amount of each feed shaft from the CPU 1, and drive respective driving parts of the machining tool as an operation object.

To the PLC (Programmable Logic Controller) 8 is connected with various kinds of external equipment such as a motion sensor 9, a lighting device 10, a coolant pump 11, a cooling device 12, a heating device 13, a lubrication pump 14, an air purge assembly 15, a mist collector 16, a chip conveyer 17, via an input output circuit, while the control device 100 is configured to control operations of the external equipment via the PLC 8.

Two priority modes of a power consumption reduction priority mode and a thermal displacement countermeasure priority mode are configured to be set by an operator as a mode for operating power consumption reduction of the external equipment as operation objects, in the control device 100 according to the present embodiment. The energy consumption reduction priority mode is a mode in that the while machining tool is controlled to minimize energy consumption, while the thermal displacement countermeasure priority mode is a mode in that an equipment which brings a great change in thermal balance of the machining tool is controlled not to stopped.

Control of the respective external devices, connected to the PLC 8, is determined based on the priority mode set in the control device 100 and the current operation condition of the machining tool under control to control ON/OFF of the external device. Concerning controlling way of the external equipment, a plurality of parameter sets, as parameter sets for controlling ON/OFF of the respective external devices, are related to machining condition of the machining tool and the priority modes and stored in the ROM 2 or the like in advance. The parameter sets are read out in accordance with the operation condition of the machining tool and the set priority mode, and the PLC 8 controls each external equipment based on the read out parameter set.

FIG. 2 is an example of a configuration table, which defines the relationship between the priority modes, the operation conditions of the machining tool, and the parameter sets, according to the present embodiment. "Setting up" state of the machining tool indicates the situation where the operator is in front of the machining tool while automatic operation is not being executed, and "Stand-by" state indicates the situation where the operator is not in front of the machining tool while automatic operation is not being executed.

FIG. 3 is an example of parameter setting according to an embodiment of the present invention. In the example shown in the FIG. 3, ON/OFF states of the external equipment as a control object are set in each parameter sets. Here, ON/OFF states of the external equipment is used as an example of the parameter in the present embodiment, but the kind of parameter is not limited to the ON/OFF states. Controllable parameter in each external equipment related to power consumption, such as illumination intensity of the lighting device or output of the mist collector, may be set.

FIG. 4 is a flow chart of power consumption reduction process according to an embodiment of the present invention.

In the configuration example shown in FIG. 2 and FIG. 3, when the priority mode is set to be the power consumption reduction priority mode and the operator is not in front of the machining tool while the machining tool is in the operation state of automatic operation, the set of parameter 2 is read out and the PLC 8 controls the lighting device to be in OFF state and other individual external equipment to be in ON state based on the parameter set.

When the priority mode is set to be the thermal displacement countermeasure priority mode and the operator is not in front of the machining tool while the machining tool is not in the operation state of automatic operation, the set of parameter 14 is read out and the PLC 8 controls the cooling device, the heating device and the like for maintaining temperature of machining tool to be in ON state and other individual external equipment to be in OFF state based on the parameter set. Thus, by setting in the thermal displacement countermeasure priority mode, the power consumption is reduced while the temperature of the machining tool is maintained in the stand-by state or the like and the deterioration of the machining accuracy by change of the thermal displacement can be avoided.

FIG. 4 is a flow chart of power consumption reduction process according to an embodiment of the present invention.

[Step SA01] Priority mode is set based on a value input through switch operation by the operator.

[Step SA02] Whether the present operation mode of the machining tool is automatic operation or not is ascertained. The ascertainment whether the machining tool is in automatic operation or not is executed by confirming whether the CPU 1 is executing automatic operation process or not. If the present operation mode of the machining tool is automatic operation, the process proceeds to Step SA 03, and if the present operation mode is not automatic operation, the process proceeds to Step SA 04.

[Step SA03] It is ascertained whether an operator is in front of the machining tool or not. The PLC 8 monitor the presence of the operator using the motion sensor 9. If the operator exists, the process proceeds to Step SA05, and if the operator does not exist, the process proceeds to Step SA06.
[Step SA04] It is ascertained whether an operator is in front of the machining tool or not. The PLC 8 monitor the presence of the operator using the motion sensor 9. If the operator exists, the process proceeds to Step SA07, and if the operator does not exist, the process proceeds to Step SA08.
[Step SA05] The operation condition of the machining tool is determined to be automatic operation (with operator).
[Step SA06] The operation condition of the machining tool is determined to be automatic operation (without operator).
[Step SA07] The operation condition of the machining tool is determined to be setting up state.
[Step SA08] The operation condition of the machining tool is determined to be stand-by state.
[Step SA09] The parameter set is read out based on the priority mode set in Step SA01 and the operation condition determined in Steps SA05 to SA08, and the external equipment is controlled based on the read out parameter set.

There is the problem in a conventional technique, that it is impossible to instantly grasp the condition of the machining tool since the condition of the machining tool is grasped by monitoring the automatic operation state and using the timer. However, in the control device 100 according to the present invention, the condition of the machining g tool is instantly grasped based on monitoring the automatic operation and the presence of the operator, while executing the flow chart in the control device 100 as shown in FIG. 4.

The invention claimed is:

1. A control device of a machining tool with power consumption reduction function, the machining tool including a plurality of power consumption devices, the power consumption devices including at least one of a heating device and a cooling device, the control device comprising:
   a priority mode selection unit configured to select at least one priority mode from a plurality of priority modes;
   a parameter set storage unit configured to store a plurality of parameter sets, wherein
      each parameter set among the plurality of parameter sets is to be used to control the plurality of power consumption devices, and
      the each parameter set corresponds to (i) a corresponding priority mode among the plurality of priority modes and (ii) an operation condition of the machining tool;
   an operation condition monitoring unit configured to monitor the operation condition of the machining tool;
   an extraction unit configured to extract the parameter set from the parameter set storage unit based on the selected priority mode and the operation condition of the machining tool; and
   an execution unit configured to execute control of the plurality of power consumption devices based on the extracted parameter set, wherein
   at least one parameter set stored in the parameter set storage unit is set with
      a parameter corresponding to the heating device having a value for making the heating device in an on state, and
      a parameter corresponding to the cooling device having a value for making the cooling device in an on state.

2. The control device according to claim 1, further comprising:
   an operator monitoring unit configured to monitor whether an operator exists around the machining tool, wherein
   the operation condition monitoring unit is configured to determine the operation condition of the machining tool based on an operation mode of the machining tool and monitoring result by the operator monitoring unit.

3. The control device according to claim 2, wherein
   the operation condition monitoring unit is configured to determine the operation condition of the machining tool is in a setup mode when the operation mode of the machining tool is not an automatic operation mode and the operator monitoring unit determines that the operator exists.

4. The control device according to claim 2, wherein
   the operation condition monitoring unit is configured to determine the operation condition of the machining tool is in a waiting mode when the operation mode of the machining tool is not an automatic operation mode and the operator monitoring unit determines that the operator does not exist.

* * * * *